United States Patent
Nolan (10) Patent No.: US 8,229,966 B2
(45) Date of Patent: Jul. 24, 2012

(54) SYSTEM TO GENERATE A STRUCTURED QUERY LANGUAGE QUERY BY USING A DIMENSIONAL HIERARCHY

(75) Inventor: Ellen Nolan, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 795 days.

(21) Appl. No.: 11/851,417

(22) Filed: Sep. 7, 2007

(65) Prior Publication Data
US 2009/0070359 A1 Mar. 12, 2009

(51) Int. Cl.
*G06F 17/30* (2006.01)
(52) U.S. Cl. ................................................ 707/797
(58) Field of Classification Search .......... 707/791–801, 707/956, 958, 999.101, E17.008
See application file for complete search history.

(56) References Cited

U.S. PATENT DOCUMENTS

| | | | |
|---|---|---|---|
| 6,430,565 B1 | 8/2002 | Berger et al. | |
| 6,618,729 B1 | 9/2003 | Bhashyam et al. | |
| 6,711,563 B1 * | 3/2004 | Koskas | 707/3 |
| 7,047,260 B1 | 5/2006 | Fink | |
| 7,058,640 B2 * | 6/2006 | Le | 707/100 |
| 7,130,859 B2 | 10/2006 | Kobayashi | |
| 7,149,736 B2 | 12/2006 | Chkodrov et al. | |
| 2002/0095430 A1 * | 7/2002 | Egilsson et al. | 707/104.1 |
| 2005/0065910 A1 * | 3/2005 | Welton et al. | 707/2 |

* cited by examiner

*Primary Examiner* — Mohammad Ali
*Assistant Examiner* — Amanda Willis
(74) *Attorney, Agent, or Firm* — Schwegman, Lundberg & Woessner, P.A.

(57) ABSTRACT

A tree-structured database is collapsed into a two-column table. The two-column table includes a characteristic key value for a given leaf node in the first column and the system identification (SID) relating to the characteristic key value in the second column and also identifying the node that leads to the characteristic key value. Data is presented by coupling the characteristic key value with a transaction table. A query that is formulated in an infocube may be translated to a relational data base query, collapsed, and reformulated into an infocube result set, or vice versa.

14 Claims, 4 Drawing Sheets

SYSTEM TO GENERATE A STRUCTURED QUERY LANGUAGE QUERY BY USING A DIMENSIONAL HIERARCHY

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright© 2007, NCR Corp. of Dayton, Ohio—All Rights Reserved.

FIELD

The disclosure relates generally to Structured Query Language queries that are used for database operations.

BACKGROUND

Virtual InfoCubes are used to retrieve and display data from non business information warehouse (BW) data sources. Virtual InfoCubes can process data without having to load the data into BW structures. Calculations may be applied to the result set before it is passed to an online analytical processor (OLAP).

Requests from BW are based on BW InfoObjects. There are two types of InfoObjects: dimension characteristics and key figures. Dimension characteristics and key figures are typically represented as a star schema composed of dimension tables and fact tables.

A virtual InfoCube's user-defined function module will compose a structured query language (SQL) query based on the list of characteristics, the list of key figures, and the list of selections with the appropriate joins, aggregates, and filters. Ideally, the user-defined function module produces an optimal SQL query that would return as few rows as necessary for the specific request. Because BW typically is only aware of dimension hierarchy leaf-node data, a query will require a less than optimal operation that returns many more rows than the user needs to satisfy a query containing one or more dimension hierarchies.

DETAILED DESCRIPTION

Under certain conditions, an SQL query is sub-optimal and the result set contains more rows than is necessary for the request. In some cases, the result set contains millions of unnecessary rows. One such case involves requests with characteristics that are part of a dimension hierarchy.

A method of collapsing a data tree includes assigning both system identification (SID) data and characteristic key value data from each node in a data tree, to a two-column data table. The two-column data table includes characteristic leaf-node key values in the first column, and in the second column, SID information for a given logical node that relates to the characteristic leaf-node that is located in the corresponding first column.

In other words, for a given row in the two-column data table, the method includes, for each characteristic leaf node, writing first the leaf-node characteristic key value to the first column and writing the corresponding leaf-node SID value to a second column in the data table. The method also includes for a root-node of the data table, writing first the leaf-node characteristic key value to the first column and writing the corresponding root-node SID value to the second column. Accordingly, where there is an intermediate node in the data tree, the method includes at an intermediate-node row, writing first the leaf-node characteristic key value to the first column, and writing the corresponding intermediate-node SID value to the second column.

SELECTED TERMINOLOGY

An "infocube" is a customized package of information that includes its own internal data representation and interface to access that data. An example of an infocube would be an SAP® Infocube of Walldorf, Germany. The infocube in SAP® is a type of object that can function as both a data target and as a provider of information. It includes its own access mechanisms and manages its own data. It is to be understood as used herein that the infocube is not limited to an application owned by SAP® of application, as it may be used in connection with any non-relational database data source, such as an objected oriented (OO) database application or any customized data sources, which are non-relational.

Various techniques presented herein utilize a "virtual infocube" implementation. The virtual infocube presents itself to a user as if it was an infocube and provides all the infocube interfaces expected and used by the user; however, the actual data or information access is achieved via pointers and translations to a relational database backbone, where the data or information actually resides and is manipulated on behalf of the user.

A "key figure" is any quantifiable measure or value for data, such as sales volume, summations of values, minimum values, maximum values, etc. Key figures are thus measures or values that a user desires to analyze. The data or information for the key figures reside in the infocube from the perspective of the user; although as will be demonstrated herein and below that data is actually present in a relational database, such that the infocube is in fact a virtual infocube (as discussed above).

"Non-cumulative key figures" are values that cannot be directly totaled from one source. For example, the value of stock over time cannot be summed to obtain its value. Yet, sales volume can be summed to obtain its value over time. So, the sales value is a cumulative key figure whereas the stock is a non-cumulative key figure. Non-cumulative key figures are often stored with a time constraint to assist in more intelligently processing the non-cumulative key figures.

A "list" as used herein may include any selective group of information acquired from a data store. For example, a list may be a set of customer identifiers associated with some predefined criteria. The criteria when embodied as a search query can be executed against the data store to return the list. It is understood that the list may include other types of information beyond just customer identifiers or numbers, such as product identifiers, store identifiers, etc.

A "set of labels" as used herein may include information that includes names and addresses. Each name and address pair is a label within the set of labels. The set of labels may be viewed as one type of list. Moreover, the list may include more information than is necessary to produce a set of labels, such as phone numbers, transaction history, customer identifiers, etc.

Figure 1:
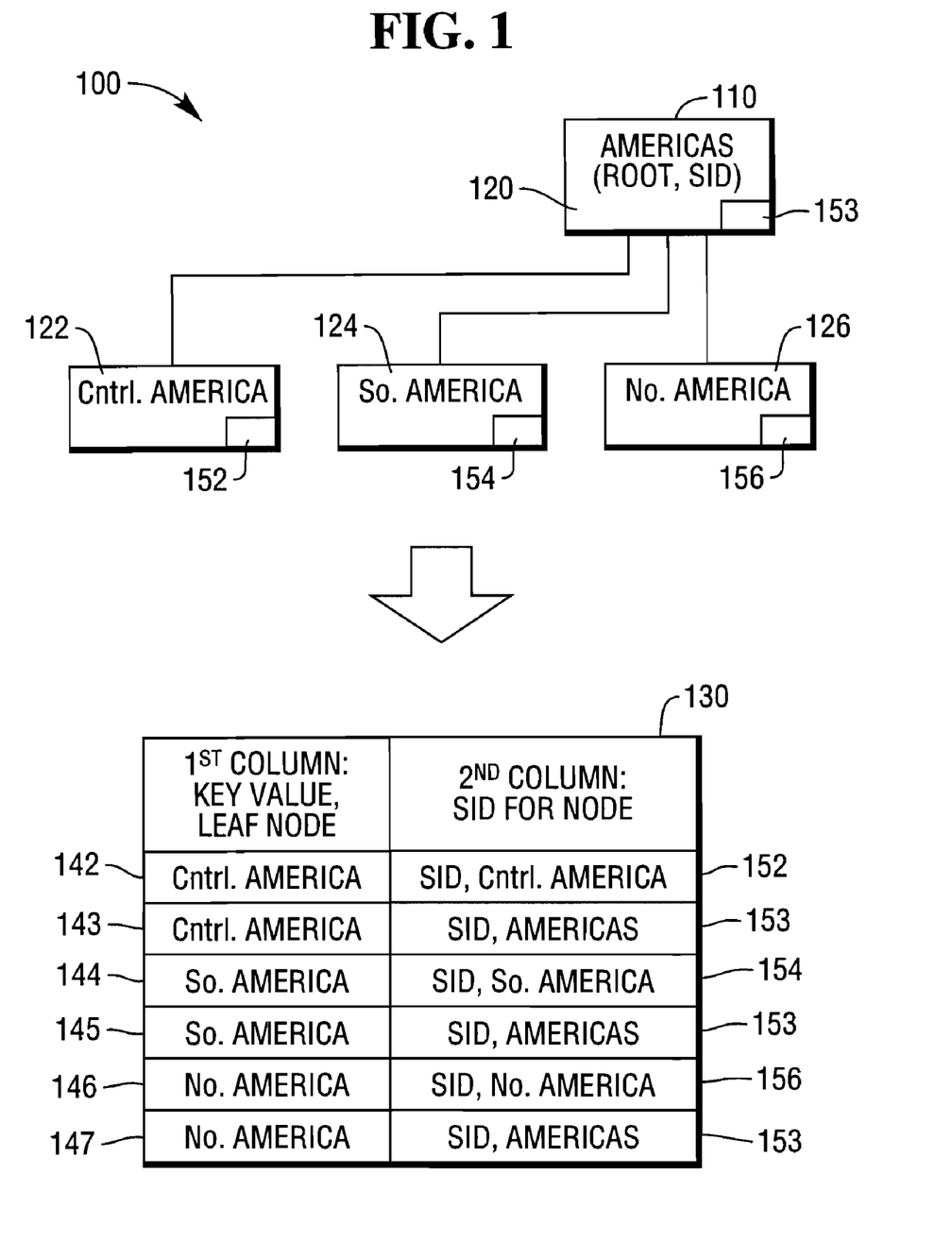
FIG. 1 is a diagram of a translation of data organized in a tree hierarchy structure to a collapsed, two-column data structure according to an example embodiment.

FIG. 1 is a diagram 100 of a translation of data organized in a tree hierarchy 110 to a collapsed, two-column data structure 130 according to an example embodiment. In FIG. 1, the tree hierarchy 110 is a simple example of a single root node 120, several leaf nodes 122, 124, 126, and no intermediate nodes.

An SAP Virtual InfoCube configuration may provide options for specifying which types of restrictions are passed to the function module. Limiting the types of restrictions passed to the remote function module will have the effect of returning a superset of the actual number of rows requested by the user, therefore, passing some or all of the filtering to the on-line application (OLAP) processor.

The option 'Expand Hierarchy Restrictions' applies to restrictions on hierarchies. All nodes in a hierarchy are uniquely identified using a 'System Identifier' (SID). Leaf nodes can also be identified using their characteristic key values. Since most Virtual Info Cubes only support the use of Key Values as identifiers in fact tables, this option is usually checked.

If the option is checked, restrictions on hierarchy nodes are converted into restrictions for the corresponding leaf nodes using their characteristic key values. If the number of leaf nodes is large, SAP might not pass any restrictions at all. Instead, SAP will request all the data available and then apply the filters on the OLAP processor.

In an example embodiment, a query seeks to aggregate useful data from a database that includes the Americas 120, including Central America 122 as a leaf node, South America 124 as a leaf node, and North America 126 also as a leaf node. Each leaf node includes a SID: the Central America 122 leaf node has the SID 152, the South America 124 leaf node has the SID 154, and the North America 126 leaf node has the SID 156. Further, the Americas 120 root node has the SID 153.

The query seeks the data from each of the Americas. Accordingly, the tree hierarchy 110 is pre-collapsed into the two-column data structure 130, such that characteristic key values that are found only in leaf nodes are located in a first column, and SID values that are found in all nodes are located in the second column.

As depicted, Central America data is collapsed into the two-column data structure 130, by locating the key value for the Central America leaf node 122 at leaf node row 142 in the first column, and the SID value 152 for the Central America leaf node 122 in the second column. Further to track the tree hierarchy traversal for the leaf-node 122, in a root-node row 143, the key value for the Central America leaf node 122 is written to the first column, and the SID value 153 for the Americas root node 120 is written to the second column. Further collapsing according to a method embodiment, it can be seen that the key value for the South America leaf node 124 is written to a second leaf-node row 144 in the first column, and the SID value 154 for the South America leaf node 124 is written to the second leaf-node row 144 in the second column. Further to track the tree hierarchy traversal for the South America leaf-node 124, in a second root-node row 145, the key value for the South America leaf node 124 is written to the first column, and the SID value 153 for the Americas root node 120 is written to the second column.

By even further collapsing according to a method embodiment, it can be seen that the key value for the North America leaf node 126 is written to a subsequent leaf-node row 146 in the first column, and the SID value 156 for the North America leaf node 126 is written to the subsequent leaf-node row 146 in the second column. Further to track the tree hierarchy traversal for the North America leaf-node 126, in a subsequent root-node row 147, the key value for the North America leaf node 126 is written to the first column, and the SID value 153 for the Americas root node 120 is written to the second column. After construction of the two-column table, a result set is provided by aggregating the SID values in the second column. In an embodiment, each leaf-node characteristic key value is joined to a transaction fact table, followed by aggregating the SID values to provide a single result-set answer to the query.

Figure 2:
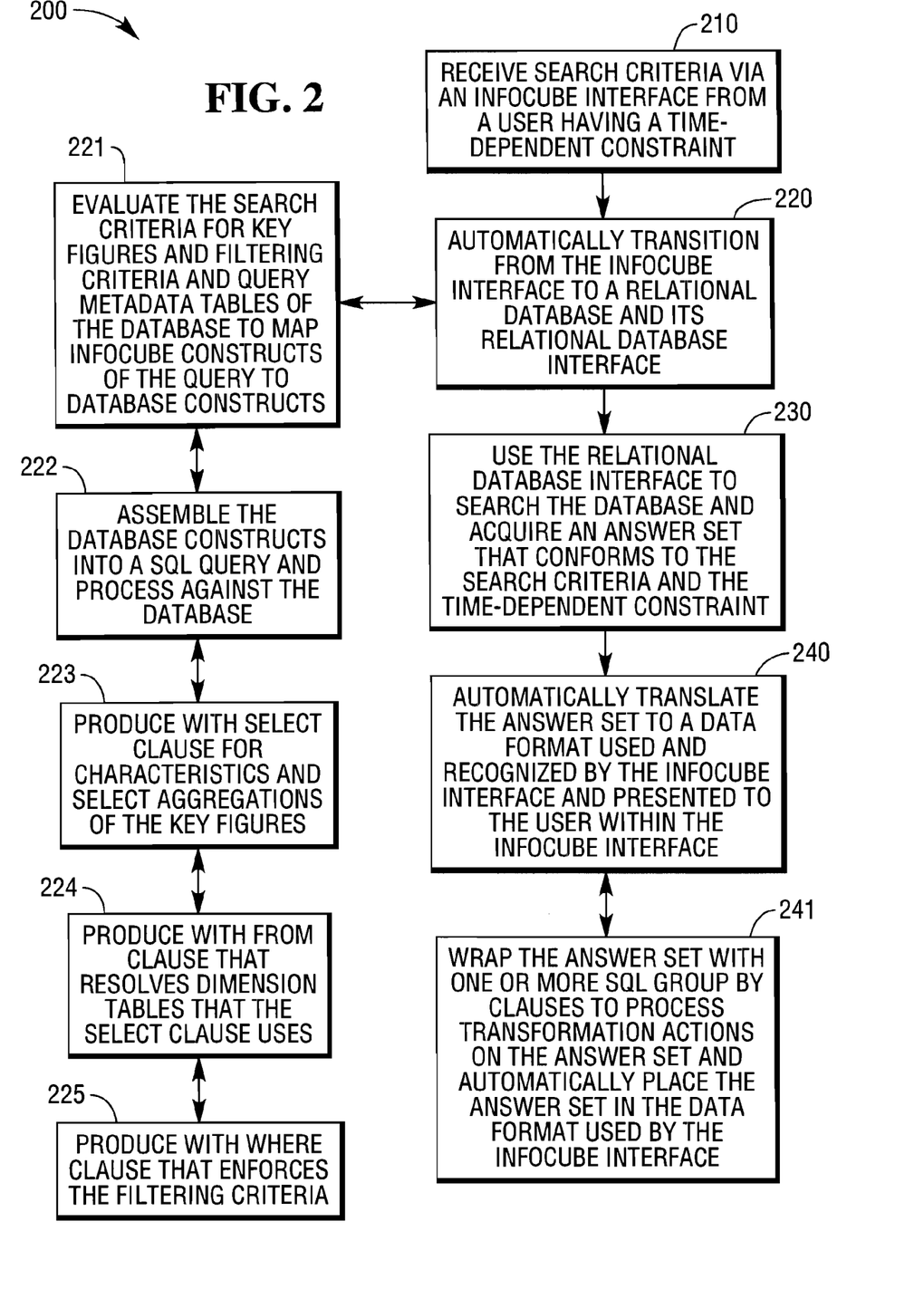
FIG. 2 is a method diagram for integrating data-access mechanisms according to an embodiment.

FIG. 2 is a method diagram 200 for integrating data-access mechanisms according to an embodiment. In an embodiment, a query is generated within an SAP Virtual InfoCube, but the data is located within a relational database such as the Teradata® warehouse product or service distributed by NCR Corporation of Dayton, Ohio. The method 200 may also be referred to as a machine-implemented method of collapsing a data-tree hierarchy. The machine-implemented method may also be referred to as bridging service, The machine-implemented method 200 is implemented in machine-accessible or computer-readable media as instructions and is executed by one or more machines (processing devices).

Moreover, the relational database service is accessible over a network. The network may be wired, wireless, or a combination of wired and wireless. Various techniques presented herein utilize a "virtual infocube" implementation. The virtual infocube presents itself to a user as if it was an infocube and provides all the infocube interfaces expected and used by the user; however, the actual data or information access is achieved via pointers and translations to a relational database backbone, where the data or information actually resides and is manipulated on behalf of the user. It is within this initial context that the processing associated with the column partitioning index service is now discussed in detail.

At 210, the relational database service receives search criteria via an infocube interface from a user. The search constraint includes at least one quantitative-dependent constraint. The search criteria can be received by a variety of mechanisms. For example, the relational database service may actively listen for InfoCube events or actions occurring within the infocube interface that indicate a search request or other data access operation is occurring. Alternatively, the infocube interface may be modified to actively report these types of operations when it might not otherwise, such that the relational database service can receive notice of the search criteria. The relational database service can therefore be actively configured to detect the data access operations including the search criteria or the infocube interface itself can be configured to report these things to the relational database service.

According to an embodiment, the relational database service may come equipped with its own interface that permits an administrator or user to actively configure information and create, modify, delete, and manage infocubes. Specific infocubes may also be directly linked to specific relational databases and manually mapped using the administrative interface of the relational database service.

At 220, the relational database service automatically transitions from the infocube interface to a relational database and a relational database interface. In other words from the perspective of the user, the user perceives the target data is being accessed with the search criteria is embedded in a particular infocube and the user makes the initial search query using the search criteria by use of the interface for the infocube. The underlying data access layer triggers the processing of the relational database service where (as discussed above at 210) the search criteria is detected by the relational database service. The relational database service then at 220, dynamically and in real time transitions from the infocube interface to a relational database format. In essence, the infocube is a "virtual infocube" from the perspective of the user. In some cases, the user may be provided an interface to actively define constructs that are called "virtual infocubes" for purposes of directly mapping an infocubes interface to a relational database backbone for the source or target data.

In an embodiment the method of achieving the processing at 220 is depicted in the method sections at 221-225.

At 221, the relational database service evaluates the search criteria in the infocube interface format for names and attributes for the constructs used in the search criteria. These names and attributes are then used to query metadata tables associated with the relational database, such as database table schemas. Matching names and attributes are then used to identify specific tables (data sources) and columns (fields) of those tables.

The metadata describes mappings between an infocube and its data constructs, also referred to as objects, and the relational database and its data constructs such as tables, columns, and fields, etc. The technique described is metadata driven. A user interface is also provided that allows administrators and users to add, modify, delete the infocube mappings included in the metadata. The metadata is therefore managed and directly modified and it provides the mappings from the infocube data to the relational database data.

At 222, these identified relational database constructs are used to generate, produce, and assemble a SQL query that is processed against the relational database. In some cases, at 223, the SQL query is produced with a SELECT clause for the characteristics (attributes) and for select aggregations of the key figures, as defined in the original search criteria. Furthermore, at 224, the SQL query can be produced with a FROM clause that resolved a specific fact table and dimension tables that the SELECT clause uses. Still further, at 225, the SQL query is produced with a WHERE clause that enforces any filtering criteria identified in the original search criteria. An entire SQL query therefore having SELECT, FROM, and WHERE clauses are produced in response to evaluating the original search criteria in the infocube data format against the metadata of the relational database.

At 230, the relational database service uses the relational database interface (such as by use of the constructed SQL query) to search the relational database and to acquire an answer set that conforms to the original search criteria and its original quantitative-dependent constraint.

The relational database service therefore has successfully transitioned an initial user's search query that was issued via an infocube interface access mechanism out of an infocube data model and into a relational database data model and acquired results set as an answer set. Accordingly, at 240, the relational database service automatically and dynamically and in real time translates the answer set to a data format recognized by the infocube interface and the answer set is presented to the user for consumption or further manipulation. One technique for achieving this is to use one transformation actions to format the relational data into constructs or formats recognized and expected by the infocube interface. These transformation actions are predefined and available to the relational database service to transform the relational data into the infocube expected data format. In some cases, this may even be done in an automated manner by using extensible markup language (XML), XML schema definitions (XSD), extensible style sheets language (XSL), and XSL transform (XSLT) applications. The relational database service therefore can process some transformations for some infocube formats without ever having encountered that particular format; this can be done when the infocube format includes an XSD and XSLT's that the relational database service can automatically call upon while parsing the relational data answer set.

In an embodiment at 241, has the relational database service wrap the answer set in one or more SQL OUTER SELECT clauses to assist each group in being processed by a particular desired transformation action to automatically place the answer set in the data format used by the infocube interface.

It is now appreciated, how the interfaces of one data model and data access mechanism can be integrated with a disparate data model and its disparate data access mechanisms in a manner that is completely transparent to the end user. In other words, the interfaces of an infocube data access model and data access mechanism can be tricked via a virtual infocube to transition to an entirely different and disparate data access mechanism associated with a relational database. The data can be managed and supported using a relational database access mechanism and yet the users can access the data, generate reports for the data, and manage the data as if it were really in an infocube data format by using interfaces and application services associated with an infocube data model.

Figure 3:
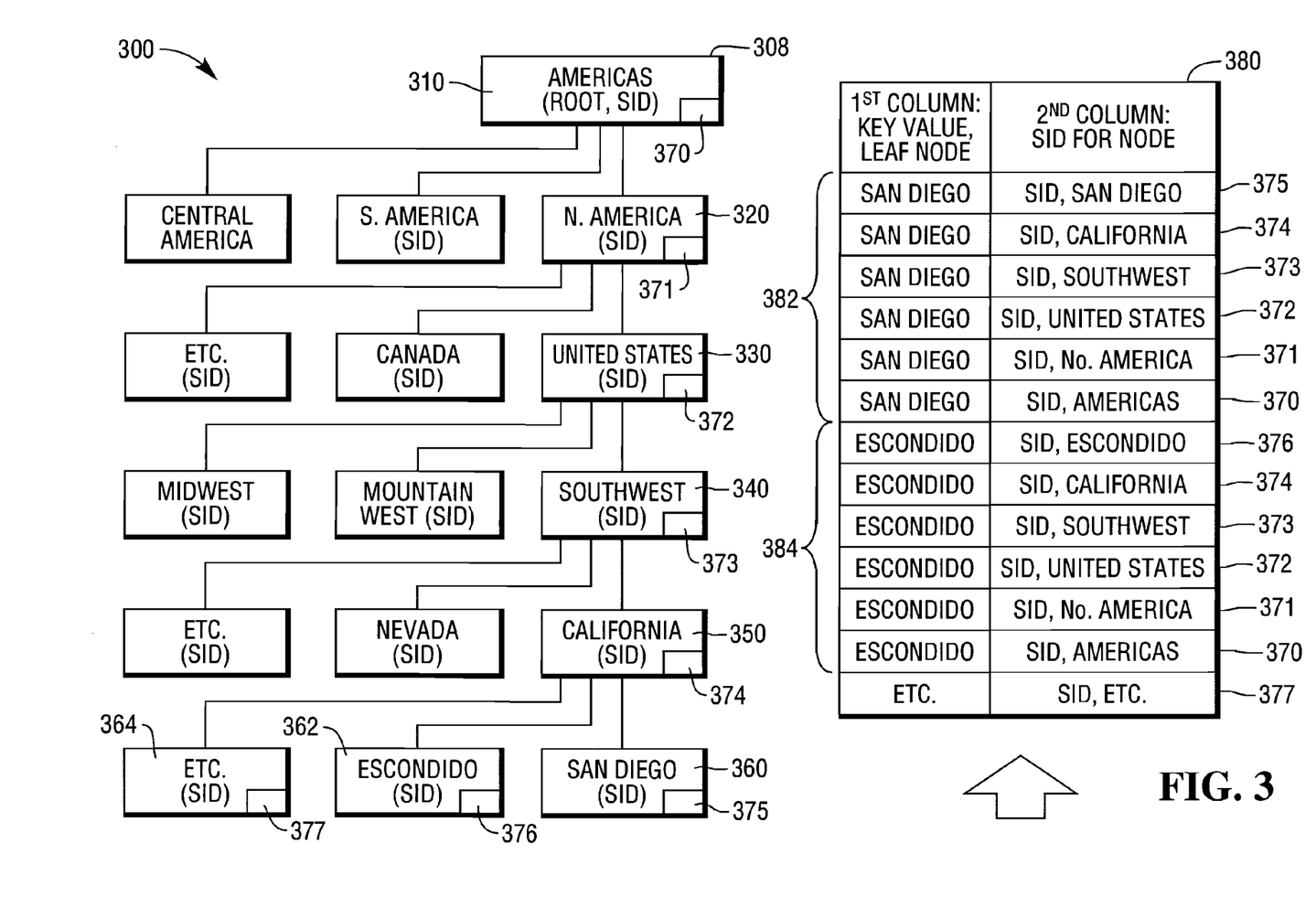
FIG. 3 is a diagram of a translation of selected data organized in a tree hierarchy structure to a collapsed, two-column data structure according to an example embodiment.

FIG. 3 is a diagram 300 of a translation of selected data organized in a hierarchy tree structure 308 to a collapsed, two-column data structure 380 according to an example embodiment. The diagram 300 represents a collapsing functionality to collapse a data-tree hierarchy into a two-column data table.

According to an embodiment an example of a hierarchy tree is: All Geography->Country->Region->State->City. If during the formulation of a query, the option 'Expand Hierarchy Restrictions' is checked, a restriction on 'Region=SOUTHWEST' is translated to one or more restrictions corresponding to all cities in the southwest, which in this embodiment would be the leaf nodes of the hierarchy tree.

According to an embodiment, instead of passing the restriction 'Region=SOUTHWEST' to the function module, it passes all cities in the southwest using key values as the city identifier: City=Escondido; City=San Diego; etc. which causes the aggregation to occur at the leaf node level. In this example, the method aggregates on cities in 'Region=SOUTHWEST. If, for example, there are 200 cities in the database that are identified geographically to be in the southwest, the result set will contain at most 200 cities. Since the user is only interested in the region SOUTHWEST, the OLAP processor aggregates the 200 leaf-node rows down to one row for the region SOUTHWEST and displays the one row as the result set.

If the option 'Expand Hierarchy Restrictions' is turned off, e.g., unchecked, a restriction on 'Region=SOUTHWEST' results in a request for the region SOUTHWEST using the SID value. If the SID value for SOUTHWEST is −14, then it will request data for NODE=−14. The method embodiment of collapsing the hierarchy tree to the two column table causes the aggregation to occur at the internal node level Region=SOUTHWEST but join at the leaf node level key values to the fact table. In an embodiment, the Virtual Info-Cube processes SID values as hierarchy node identifiers. In this embodiment, the result set for this example contains one row for the region SOUTHWEST instead of 200 rows for all cities in the SOUTHWEST only to have the OLAP processor aggregate and display one row to the user.

In FIG. 3, the tree hierarchy 308 is an example of a single-root node 310, several intermediate nodes, and several leaf nodes. Selected intermediate nodes are enumerated including N. AMERICA 320, UNITED STATES 330, SOUTHWEST 340 and, CALIFORNIA 350. Except for the intermediate node CALIFORNIA 350 the other intermediate nodes are depicted without leaf nodes for simplicity.

Leaf nodes for the intermediate node CALIFORNIA 350, include the leaf node SAN DIEGO 360, ESCONDIDIO 362, and ETC. 364. The leaf node SAN DIEGO 360 includes both a key value and a SID value 375. The leaf node ESCONDIDIO 362 includes both a key value and a SID value 376. And the leaf node ETC. 364 includes both key value(s) and a SID value 377.

In an example embodiment, a query seeks to aggregate useful data from a database such as a BW that includes the Americas. For simplicity of illustration, the query seeks the data from the United States such as units sold within a quantity restriction such as a fiscal quarter. Accordingly, the tree hierarchy 308 is pre-collapsed into the two-column data structure 380, such that key values that are found only in leaf nodes are located in a first column, and SID values that are found in all nodes are located in the second column. In other words, the several SID values that are placed into the second column, form a "paper trail" of traversal of the data tree hierarchy that relates each leaf node through various intermediate nodes, and to the root node.

As depicted, the San Diego data is collapsed into the two-column data structure 380, by locating the key value for the leaf node SAN DIEGO 360 at a leaf node row in the first column and that shares the SID value 375 for the leaf node SAN DIEGO 360 in the second column. Similarly, the key value for the leaf node SAN DIEGO 360 is located at an intermediate-node row in the first column that shares the SID value for CALIFORNIA 374 in the second column. Further, the key value for the leaf node SAN DIEGO 360 is located at an intermediate-node row in the first column that shares the SID value for SOUTHWEST 373 in the second column. Yet further, the key value for the leaf node SAN DIEGO 360 is located at an intermediate-node row in the first column that shares the SID value for UNITED STATES 372 in the second column. Even yet further, the key value for the leaf node SAN DIEGO 360 is located at an intermediate-node row in the first column that shares the SID value for N. AMERICA 371 in the second column. Finally in this example embodiment for San Diego, the key value for the leaf node SAN DIEGO 360 is located at a root-node row in the first column that shares the SID value for AMERICAS 370 in the second column.

Further to track the tree hierarchy traversal for the leaf node ESCONDIDO 362, the Escondido data is collapsed into the two-column data structure 380, by locating the key value for the leaf node ESCONDIDO 362 at a leaf node row in the first column that shares the SID value 376 for the leaf node ESCONDIDO 362 in the second column. Similarly, the key value for the leaf node ESCONDIDO 362 is located at an intermediate-node row first column that shares the SID value for CALIFORNIA 374 in the second column. Further, the key value for the leaf node ESCONDIDO 362 is located at an intermediate-node row in the first column that shares the SID value for SOUTHWEST 373 in the second column. Yet further, the key value for the leaf node ESCONDIDO 362 is located at an intermediate-node row in the first column that shares the SID value for UNITED STATES 372 in the second column. Even yet further, the key value for the leaf node ESCONDIDO 362 is located at an intermediate-node row in the first column that shares the SID value for N. AMERICA 371 in the second column. Finally in this example embodiment for Escondido, the key value for the leaf node ESCONDIDO 362 is located at a root-node row in the first column that shares the SID value for AMERICAS 370 in the second column.

It can now be seen that the collapsing method can be carried out for each leaf node that is identified in a query.

Figure 4:
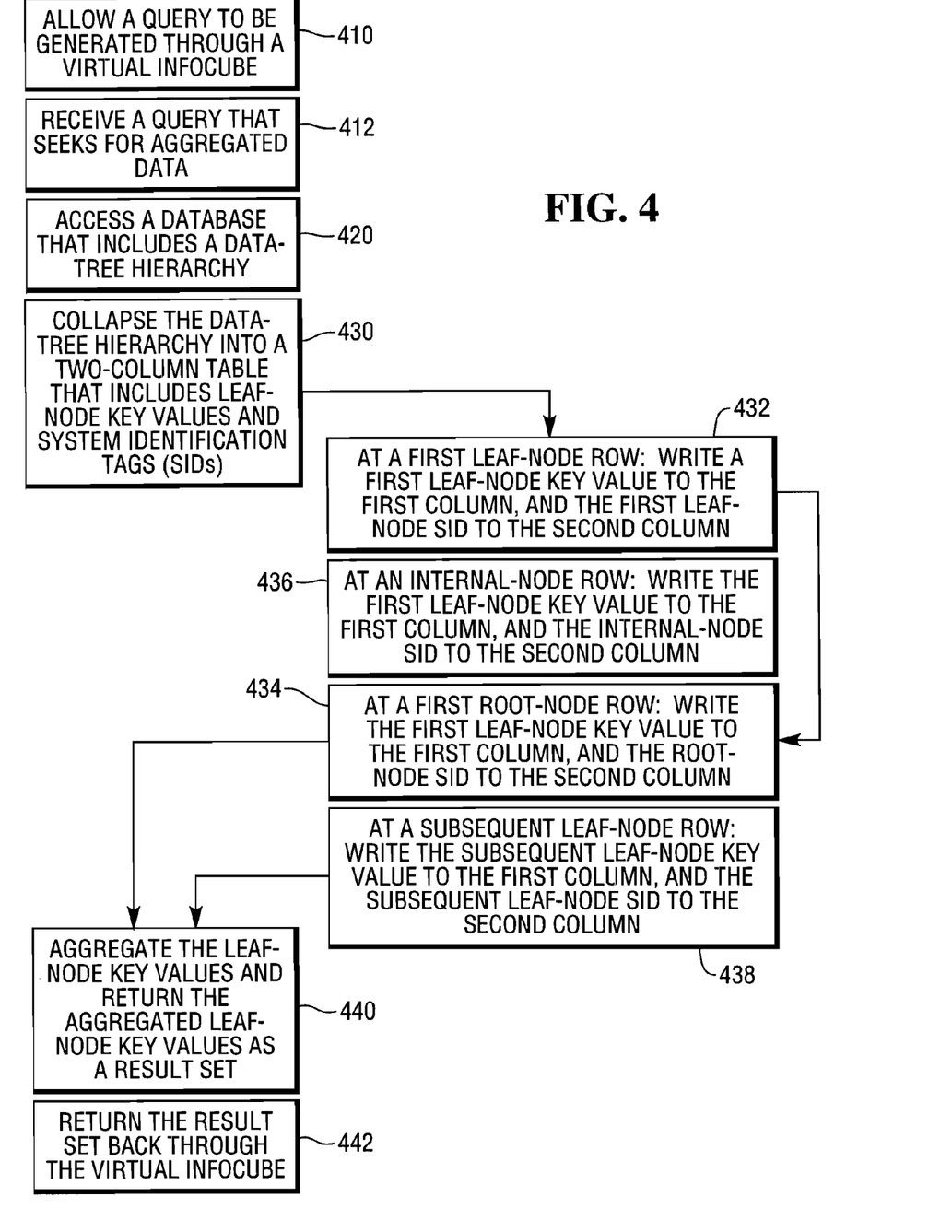
FIG. 4 is a method flow diagram according to an embodiment.

FIG. 4 is a method flow diagram. In an embodiment, a data tree hierarchy is collapsed. The data tree includes at least one leaf node, at least one internal node, and at least one root node, and each node including a system identification (SID).

At 430, the method includes collapsing the data tree hierarchy into a two-column table that includes leaf-node key values in the first column and SID values in the second column.

At 432, for each leaf-node, the method at a leaf-node row, writing first the leaf-node key value to a first column in a data table and writing a corresponding leaf-node SID value to a second column in the data table.

At 434, the method includes at a root-node row, writing first the leaf-node key value to the first column writing a corresponding root-node SID value to the second column.

At 436, the method includes at an internal-node row, writing first the leaf-node key value to the first column and writing a corresponding internal-node SID to the second column At 438, the method includes at a subsequent leaf-node row, writing a subsequent leaf-node key value to the first column, and writing a corresponding subsequent leaf-node SID to the second column.

At 410, the method includes allowing a query to be generated through a virtual infocube.

At 412, the method includes receiving a query that seeks for aggregated data. In an embodiment, the method commences at 412.

At 420, the method includes accessing a database that includes a data tree hierarchy.

At 440, the method includes joining leaf-node key values to the fact table and returning a result set with the aggregated SID values.

At 442, the method includes returning the result set back through the virtual infocube with the aggregated SID values.

An applied example method is given. A user uses a virtual infocube to generate a query. The query necessitates the access of a relational database such as a tree hierarchy database. The database includes, among other things, customer data, fields, procedures, list and label tables, etc. The customer data is the data managed by an enterprise for its customers. It may include a variety of types of information, such as names, transaction history, loyalty level, relationships to other groups or customers, address, phone, email, and the like.

A method to generate a mapping table includes accepting the query and passing restrictions to the function module of the virtual infocube by use of three tables:

| | |
|---|---|
| i_t_range: | FEMS = 0 restrictions |
| i_tx_rangetab: | FEMS > 0 restrictions |
| i_tsx_hier: | Hierarchy restrictions. |

If the 'Expand Hierarchy Restriction' option is turned off (not checked), an entry with the field "COMPOP"=HI is created in the appropriate place in the table i_t_range or i_tx_range_tab for restrictions on hierarchy nodes. The number in the "LOW" field corresponds to the number in the "POSIT" field in table i_tsx_hier.

Each entry in i_tsx_hier includes a Table of Hierarchy Restrictions and the Characteristic Name. The Table of Hierarchy Restrictions contains information about each restriction on a hierarchy node. The SID field contains the SID value of the start node the restriction applies to. The ReturnLevel field contains the number of levels deep in the tree to traverse.

For example, if the restriction is YREGION=SOUTHWEST and the RETURNLEVEL is 1, then the lowest level requested is YSTATE. That is all states in the Southwest. The aggregation is at the YSTATE level and the result set must contain SID values for states in the midwest. In a tree hierarchy, only leaf nodes have key values as identifiers and internal nodes do not have any key values associated with them; they only have internal SID values. Exported master data from BW contains key values only. Consequently, only key values for leaf nodes are included in the exported master data and fact tables. Therefore, in order to return a result set containing SID values, the method includes mapping SID values to the appropriate leaf node key values as set forth in FIGS. 1 and 3. Further, the method includes joining to the appropriate dimension table or fact table using the key values.

A solution embodiment includes:
First, process hierarchy data in the hierarchy table.
Loop through i_t_range and i_tx_range_tab.
If the COMPOPfield is equal to HI,
then process the corresponding hierarchy data in the i_tsx_hier table.

The LOWfield in i_t_range and i_tx_range_tab references the POSIT field in the i_tsx_hier.

The referenced data in i_tsx_hier contains the SID value of the start node, the HIESID (hierarchy ID), the sver (hierarchy version), and the return level.

Next the original data in i_t_range or i_tx_range_tab is modified by assigning the SID value of the start node to the field LOW and assigning the HIESID, the SVER, and the RETURNLEVEL to the field HIGH.

```
Data in i_t_range:
EXPRESSION=0
INFOOBJECT=YCITYID
SIGN=I
COMPOP=HI
LOW=0
Data at posit=0 of i_tsx_hier:
HIESID=45
SVER =A
SID=-23
RETURNLEVEL =1
Modified data in i_t_range:
EXPRESSION=0
INFOOBJECT=YCITYID
SIGN=I
COMPOP=HI
LOW=-23
HIGH=45;A;1
```

Second, extract the SID hierarchy table for the infoobject. The table name is /BIC/I<INFOOBJECTNAME>.
If the infoobject is YCITYID,
then SID hierarchy table name is /BIC/IYCITYID.
Third, extract the Master Data table for the infoobject. The Master Data table maps SIDs of leaf nodes to key values. The table name is /BIC/S<INFOOBJECTNAME>.
If the infoobject is YCITYID,
then the Master Data table is /BIC/SYCITYID.

Fourth Traverse the hierarchy using the SID hierarchy table and create a two column table which maps all nodes using their SID values in the hierarchy to the appropriate leaf node KEY values. For each leaf node in the tree, walk up the hierarchy to the root of the tree. For each node that you visit, add an entry into the two column table (KEY value of leaf node, SID of the node being visited).

For example, if the path from the root to the leaf node 139 is (−12−>−47−>−69−>139) and the KEY value for the leaf node, 139, is 144, then there should be 4 entries in the two column table:
(144, −12)
(144, −47)
(144, −69), and
(144, 139).

Fifth, at runtime, determine the SID values to return by recursively traversing the hierarchy tree starting at the start node and terminating at the read level. Use the two column table from step 4 above to join to a Fact Table or Dimension Table. For example, if the start node is SOUTHWEST (SID=−8) and the read level is 0, then return the rows in the Fact Table that join to the two column table with SID=−8. There should be an entry in the two column table for each city in the SOUTHWEST that rolls up to SOUTHWEST. The result set should contain only one row since we are aggregating on SOUTHWEST.

If the start node is SOUTHWEST (SID=−8) and the read level is 1, then recursively traverse the hierarchy tree and return the rows in the Fact Table that join to the two column table with SID values equal to the SID values for all states in the SOUTHWEST. In an embodiment, there is an entry in the two column table for each city in the SOUTHWEST that rolls up to a state in the SOUTHWEST. The result set may contain a row for each state in the SOUTHWEST.

The various method embodiments enable Virtual Info-Cubes to generate an optimal SQL query for requests containing characteristics that are part of a dimension hierarchy. The optimal SQL query aggregates at the correct level in the dimension hierarchy and produces a result set with the fewest rows necessary to display to the user. The OLAP processor does not need to aggregate further. In recent POCs, using this solution reduced the result set from millions of rows to just a few thousand rows.

The above description is illustrative, and not restrictive. Many other embodiments will be apparent to those of skill in the art upon reviewing the above description. The scope of embodiments should therefore be determined with reference to the appended claims, along with the fill scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed:

1. A machine-implemented method of collapsing a data tree hierarchy, the data tree hierarchy including leaf nodes and at least one root node, and each node including a system identification (SID), the method comprising:
for each leaf node,
at a leaf-node row:
writing a leaf-node key value to a first column in a data table; and
writing a corresponding leaf-node SID value to a second column in the data table; and
at a root-node row:
writing the leaf-node key value to the first column; and
writing a corresponding root-node SID value to the second column, the entire data tree hierarchy collapsed into the first column and the second column, the second column having the leaf-node SID values representing a trail of traversal of the tree for each leaf node through intermediate nodes and to the at least one root node.

2. The method of claim 1, the data-tree hierarchy including at least one internal node, the method further including:
at an internal-node row:
writing the leaf-node key value to the first column; and
writing a corresponding internal-node SID value to the second column.

3. The method of claim 1, further including:
at a subsequent leaf-node row:
writing a subsequent leaf-node key value to the first column; and
writing a corresponding subsequent leaf-node SID value to the second column; and
at a root-node row:
writing the subsequent leaf-node key value to the first column; and
writing a corresponding root-node SID value to the second column.

4. The method of claim 1, further including:
at a subsequent leaf-node row:
writing a subsequent leaf-node key value to the first column; and
writing a corresponding subsequent leaf-node SID value to the second column;
at a root-node row:
writing the subsequent leaf-node key value to the first column; and
writing a corresponding root-node SID value to the second column; and
aggregating the SID values.

5. The method of claim 1, further including:
receiving a search criteria via an infocube interface from a user;
automatically transitioning from the infocube interface to a relational database interface;
using the relational database interface to search the relational database and to acquire an answer set that includes at least the first leaf-node row and the root-node row; and
automatically translating the answer set to a data format used and recognized by the infocube interface and presenting to the user within the infocube interface.

6. The method of claim 5, wherein automatically transitioning further includes evaluating the search query for key values and filtering criteria defined therein and querying metadata tables of the relational database to map infocube constructs found in the search criteria to relational database constructs.

7. The system of claim 6, wherein using further includes assembling the relational database constructs into a SQL query and processing the SQL query as the search against the relational database.

8. The method of claim 1, further including joining each leaf node key value to a transaction table.

9. A machine-implemented method, comprising:
collapsing an entire data tree hierarchy into a two-column data table, the data tree hierarchy includes leaf nodes, at least one intermediate node, and at least one root node, and each node including a system identification (SID);
collapsing includes:
for each leaf node, writing a leaf-node key value to only the first column in the data table, and writing a corresponding leaf-node SID value to only the second column in the data table, the second column representing a trail of traversal through the data tree hierarchy for each leaf node though the at least one intermediate node and to the at least one root node;
at a next row, writing the leaf-node key value to the first column, and writing a corresponding internal-node SID value to the second column;
at yet a next row, writing the leaf-node key value to the first column, and writing a corresponding root-node SID value to the second column;
at still yet a next row, writing a subsequent leaf-node key value to the first column, and writing a corresponding subsequent leaf-node SID value to the second column; and
aggregating the SID values.

10. The method of claim 9, further including:
receiving a search criteria via an infocube interface from a user;
automatically transitioning from the infocube interface to a relational database interface;
using the relational database interface to search the relational database and to acquire an answer set that includes at least the first leaf-node row and the root-node row; and
automatically translating the answer set to a data format used and recognized by the infocube interface and presenting to the user within the infocube interface.

11. The method of claim 10, wherein automatically transitioning further includes evaluating the search query for key values and filtering criteria defined therein and querying metadata tables of the relational database to map infocube constructs found in the search criteria to relational database constructs.

12. The system of claim 11, wherein using further includes assembling the relational database constructs into a SQL query and processing the SQL query as the search against the relational database.

13. The method of claim 9, further including joining each leaf node key value to a transaction table.

14. The method of claim 9, further including:
joining each leaf node key value to a transaction table;
aggregating data using SID values; and
presenting the SID value for the requested node with the aggregated data.

* * * * *